US009534082B2

(12) United States Patent
Sakoh

(10) Patent No.: US 9,534,082 B2
(45) Date of Patent: Jan. 3, 2017

(54) FLUOROPOLYETHER-CONTAINING POLYMER

(71) Applicant: Shin-Etsu Chemical Co., Ltd., Tokyo (JP)

(72) Inventor: Ryusuke Sakoh, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 14/668,223

(22) Filed: Mar. 25, 2015

(65) Prior Publication Data

US 2015/0274888 A1 Oct. 1, 2015

(30) Foreign Application Priority Data

Mar. 31, 2014 (JP) ................................ 2014-074126

(51) Int. Cl.
*C08G 65/22* (2006.01)
*C08G 65/00* (2006.01)
*C08G 65/332* (2006.01)

(52) U.S. Cl.
CPC .......... *C08G 65/005* (2013.01); *C08G 65/007* (2013.01); *C08G 65/332* (2013.01); *C08G 65/3322* (2013.01); *C08G 2650/02* (2013.01); *C08G 2650/48* (2013.01)

(58) Field of Classification Search
CPC ...................................................... C08G 65/22
USPC ......................................... 528/392, 401, 402
See application file for complete search history.

(56) References Cited

U.S. PATENT DOCUMENTS 8,900,711 B2 12/2014 Yamane et al.

FOREIGN PATENT DOCUMENTS

| | | |
|---|---|---|
| EP | 1 555 297 A1 | 7/2005 |
| EP | 1 632 516 A2 | 3/2006 |
| EP | 2 436 716 A1 | 4/2012 |
| JP | 2012-72272 | 4/2012 |
| WO | WO 2013/050273 A1 | 4/2013 |
| WO | WO 2013/121984 A1 | 8/2013 |

OTHER PUBLICATIONS

Sheveleva et al; Synthesis of 4-hydroxy-4-perfluoroalkyl-1,6-diene polymers under high pressure; 1994;Nauka journal (Russia); Chem Abstract 123: 33760.*

Extended European Search Report issued Sep. 1, 2015 in Patent Application No. 15159694.7.

* cited by examiner

*Primary Examiner* — Duc Truong

(74) *Attorney, Agent, or Firm* — Oblon, McClelland, Maier & Neustadt, L.L.P.

(57) ABSTRACT

A fluoropolyether-containing polymer of formula (1) is novel wherein Rf is a polymer residue containing a monovalent fluorooxyalkyl or divalent fluorooxyalkylene group, Z is a divalent hydrocarbon group, and α is 1 or 2. The polymer may be converted into a fluoropolyether-containing polymer-modified silane, which forms a water/oil repellent coating having weatherability.

(1)

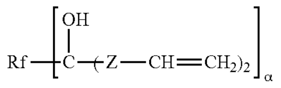

15 Claims, No Drawings

FLUOROPOLYETHER-CONTAINING POLYMER

CROSS-REFERENCE TO RELATED APPLICATION

This non-provisional application claims priority under 35 U.S.C. §119(a) on Patent Application No. 2014-074126 filed in Japan on Mar. 31, 2014, the entire contents of which are hereby incorporated by reference.

TECHNICAL FIELD

This invention relates to a fluoropolyether-containing polymer which can be converted to a fluoropolyether-containing polymer-modified silane having weatherability.

BACKGROUND ART

Generally, perfluorooxyalkylene-containing compounds exhibit, by virtue of their extremely low surface free energy, excellent water/oil repellency, chemical resistance, lubricity, parting, antifouling and other properties. Taking advantage of these properties, they find use in a variety of industrial fields as water/oil repellent antifouling agents for paper and textiles, lubricants for magnetic recording media, oil-repellent agents for precision instruments, parting agents, cosmetic ingredients, protective films and the like. Inversely, the same properties indicate non-tackiness or non-adhesion to other substrates. Even if they can be coated to the substrate surface, it is difficult for the coating to tightly adhere thereto.

On the other hand, silane coupling agents are well known for their ability to bond organic compounds to surfaces of substrates of glass or fabric. They are widely used as surface coating agents for numerous substrates. The silane coupling agent contains an organic functional group and a reactive silyl group (typically alkoxysilyl) in the molecule. In the presence of airborne moisture or the like, the alkoxysilyl groups undergo self-condensation reaction to form a coating. As the alkoxysilyl groups form chemical and physical bonds with the surface of glass or metal, the coating becomes a tough coating having durability.

Patent Document 1 discloses a composition predominantly comprising a fluorooxyalkylene-containing polymer of the formula shown below. Lenses and antireflective coatings, when treated with fluorooxyalkylene-containing polymer-modified silane, are improved in lubricity, parting property and wear resistance, but lack weather resistance.

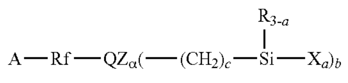

Herein Rf is $-(CF_2)_d-(OC_2F_4)_e(OCF_2)_f-O(CF_2)_d-$, A is a monovalent fluorinated group terminated with a $-CF_3$ group, Q is a divalent organic group, Z is a di- to octa-valent organopolysiloxane residue having a siloxane bond, R is an alkyl group having 1 to 4 carbon atoms or phenyl group, X is a hydrolyzable group, a is 2 or 3, b is an integer of 1 to 6, c is an integer of 1 to 5, $\alpha$ is 0 or 1, d is independently 0 or an integer of 1 to 5, e is an integer of 0 to 80, f is an integer of 0 to 80, the sum e+f is an integer of 5 to 100, and the repeating units may be randomly arranged.

Citation List

Patent Document 1: JP-A 2012-072272 (U.S. Pat. No. 8,900,711, EP 2436716)

DISCLOSURE OF INVENTION

An object of the invention is to provide a fluoropolyether-containing polymer which can be converted to a fluoropolyether-containing polymer-modified silane capable of forming a water/oil repellent layer having weatherability.

The inventor has found that a surface treating agent which is analogous to the fluorooxyalkylene-containing polymer-modified silane mentioned above, but uses an ether bond-free linker as the linker between the fluorooxyalkylene group and the hydrolyzable silyl group is capable of forming a water/oil repellent layer having weatherability.

Continuing research works, the inventor has discovered that a fluoropolyether-containing polymer of the general formula (1) is novel and after silane modification, becomes a polymer having an ether bond-free linker between the fluorooxyalkyl or fluorooxyalkylene group and the hydrolyzable silyl group.

Accordingly, the invention provides a fluoropolyether-containing polymer having the general formula (1):

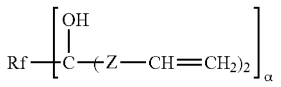

(1)

wherein Rf is a polymer residue containing a monovalent fluorooxyalkyl group or divalent fluorooxyalkylene group, Z is a divalent hydrocarbon group, and $\alpha$ is 1 or 2.

In one preferred embodiment, $\alpha$ is 1, and Rf is a group having the general formula (2):

$$F-(CF_2O)_p-(C_2F_4O)_q-(C_3F_6O)_r-(C_4F_8O)_s \quad (2)$$

wherein p, q, r and s are each independently an integer of 0 to 200, the sum p+q+r+s is 3 to 200, each repeating unit may be linear or branched, and individual repeating units may be randomly arranged.

In another preferred embodiment, $\alpha$ is 2, and Rf is a group having the general formula (3):

$$-O-(CF_2O)_p-(C_2F_4O)_q-(C_3F_6O)_r-(C_4F_8O)_s \quad (3)$$

wherein p, q, r and s are each independently an integer of 0 to 200, the sum p+q+r+s is 3 to 200, each repeating unit may be linear or branched, and individual repeating units may be randomly arranged.

In a preferred embodiment, Z is a straight alkylene group of 1 to 4 carbon atoms or phenylene group.

ADVANTAGEOUS EFFECTS OF INVENTION

The fluoropolyether-containing polymer of formula (1) is novel and useful as a precursor to fluoropolyether-containing polymer-modified silane. The polymer may be converted into a fluoropolyether-containing polymer-modified silane, which forms a coating having high water/oil repellency. When treated with a surface treating agent comprising the fluoropolyether-containing polymer-modified silane and/or a partial hydrolytic condensate thereof, a variety of articles are endowed with excellent water/oil repellency, become highly resistant to UV, and maintain antifouling over a long term.

DESCRIPTION OF PREFERRED EMBODIMENTS

The fluoropolyether-containing polymer of the invention has the general formula (1).

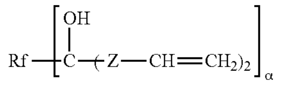

(1)

Herein Rf is a polymer residue containing a monovalent fluorooxyalkyl group or divalent fluorooxyalkylene group, Z is a divalent hydrocarbon group, and α is 1 or 2.

In one preferred embodiment wherein α is 1, Rf is a monovalent fluorooxyalkyl group having the general formula (2):

$$F\text{-}(CF_2O)_p\text{-}(C_2F_4O)_q\text{-}(C_3F_6O)_r\text{-}(C_4F_8O)_s \quad (2)$$

wherein p, q, r and s are each independently an integer of 0 to 200, preferably 10 to 100, the sum p+q+r+s is 3 to 200, preferably 10 to 100, each repeating unit may be linear or branched, and individual repeating units may be randomly arranged.

In another preferred embodiment wherein α is 2, Rf is a divalent fluorooxyalkylene group having the general formula (3):

$$-O\text{-}(CF_2O)_p\text{-}(C_2F_4O)_q\text{-}(C_3F_6O)_r\text{-}(C_4F_8O)_s\text{-} \quad (3)$$

wherein p, q, r and s are each independently an integer of 0 to 200, preferably 10 to 100, the sum p+q+r+s is 3 to 200, preferably 10 to 100, each repeating unit may be linear or branched, and individual repeating units may be randomly arranged.

Examples of Rf are shown below.

$F(CF_2O)_p(CF_2CF_2O)_q$— p:q=47:53, p+q≈45

$F(CF_2O)_p(CF_2CF_2O)_q(CF_2CF_2CF_2O)_r$— p:q:r=47:52:1, p+q+r≈45

$F(CF_2O)_p(CF_2CF_2O)_q(CF_2CF_2CF_2CF_2O)_s$— p:q:s=47:52:1, p+q+s≈45

$F(CF_2O)_p(CF_2CF_2O)_q(CF_2CF_2CF_2O)_r(CF_2CF_2CF_2CF_2O)_s$— p:q:r:s=46:52:1:1, p+q+r+s≈45

$F(CF_2CF_2O)_{10}$—

$F(CF_2CF_2CF_2O)_{25}$—

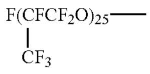

—$O(CF_2O)_p(CF_2CF_2O)_q$— p:q=47:53, p+q≈45

—$O(CF_2O)_p(CF_2CF_2O)_q(CF_2CF_2CF_2O)_r$— p:q:r=47:52:1, p+q+r≈45

—$O(CF_2O)_p(CF_2CF_2O)_q(CF_2CF_2CF_2CF_2O)_s$— p:q:s=47:52:1, p+q+s≈45

—$O(CF_2O)_p(CF_2CF_2O)_q(CF_2CF_2CF_2O)_r(CF_2CF_2CF_2CF_2O)_s$— p:q:r:s=46:52:1:1, p+q+r+s≈45

—$O(CF_2CF_2CF_2O)_{25}$—

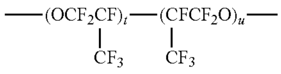

$t + u \approx 25$

Herein, p, q, r and s are as defined above, t is an integer of 1 to 24, u is an integer of 1 to 24, t+u=r, and individual repeating units may be randomly arranged.

In formula (1), Z is a divalent hydrocarbon group, examples of which include alkylene groups of 1 to 8 carbon atoms, preferably 1 to 4 carbon atoms, such as methylene, ethylene, propylene (trimethylene or methylethylene), butylene (tetramethylene or methylpropylene), hexamethylene and octamethylene, arylene groups such as phenylene, and combinations of two or more thereof such as alkylene-arylene groups. Preferably Z is a linear alkylene group of 1 to 4 carbon atoms or phenylene. Since the fluoropolyether-containing polymer of the invention does not contain a linker (typically ether bond) with low bond energy in the molecule as Z in formula (1), a fluoropolyether-containing polymer-modified silane obtained from silylating modification of the polymer of formula (1) can form a coating having improved weather resistance and mar resistance.

The preferred groups of Z are exemplified below.

—$CH_2$—

—$CH_2CH_2$—

—$CH_2CH_2CH_2$—

—$CH_2CH_2CH_2CH_2$—

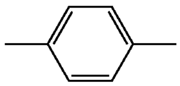

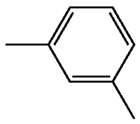

Examples of the fluoropolyether-containing polymer of formula (1) are shown below. In each formula, the repetition number of repeating units in the form of fluorooxyalkyl or fluorooxyalkylene groups, also referred to as degree of polymerization, may be an arbitrary number meeting formula (2) or (3).

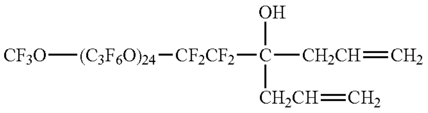

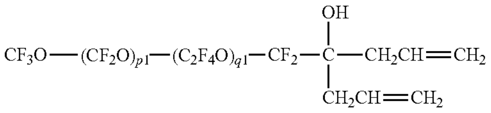

p1:q1 = 47:53, p1 + q1 ≈ 43

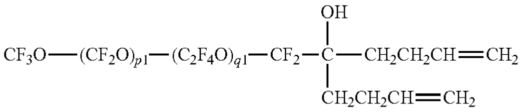

p1:q1 = 47:53, p1 + q1 ≈ 43

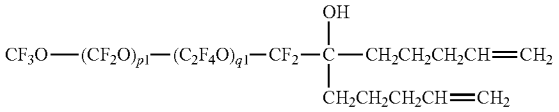

p1:q1 = 47:53, p1 + q1 ≈ 43

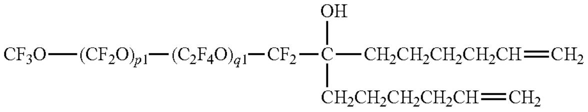

p1:q1 = 47:53, p1 + q1 ≈ 43

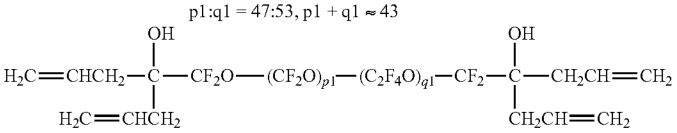

p1:q1 = 47:53, p1 + q1 ≈ 43

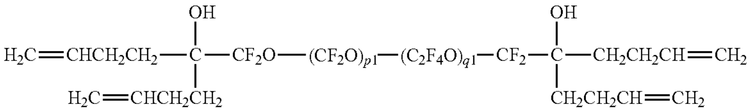

p1:q1 = 47:53, p1 + q1 ≈ 43

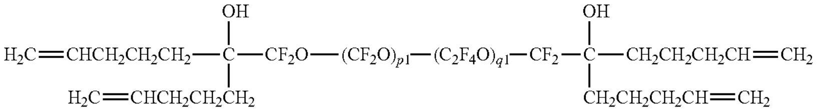

p1:q1 = 47:53, p1 + q1 ≈ 43

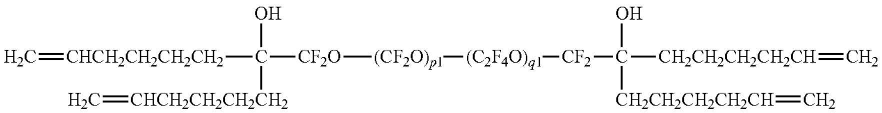

p1:q1 = 47:53, p1 + q1 ≈ 43

The fluoropolyether-containing polymer of formula (1) wherein $\alpha$ is 1 may be prepared, for example, by the following method. A perfluorooxyalkyl-containing polymer having an acid fluoride group (—C(=O)—F) at one end of the molecular chain is mixed with a Grignard reagent as a nucleophilic reagent and a solvent such as 1,3-bistrifluoromethylbenzene or tetrahydrofuran, and aged at a temperature of 0 to 80° C., preferably 50 to 70° C., and more preferably about 60° C. for 1 to 6 hours, preferably 3 to 5 hours, and more preferably about 4 hours.

Besides the acid fluoride, the perfluorooxyalkyl-containing polymer may have another group at one end of the molecular chain, such as acid halide, acid anhydride, ester, carboxylic acid or amide. Examples of the perfluorooxyalkyl-containing polymer having such a group at one end of the molecular chain are shown below.

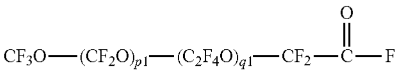

p1:q1 = 47:53, p1 + q1 ≈ 43

-continued

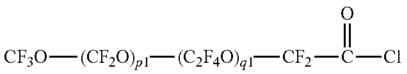

p1:q1 = 47:53, p1 + q1 ≈ 43

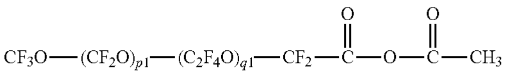

p1:q1 = 47:53, p1 + q1 ≈ 43

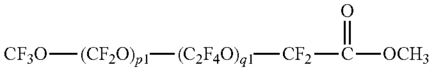

p1:q1 = 47:53, p1 + q1 ≈ 43

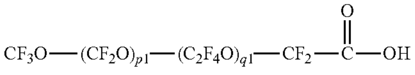

p1:q1 = 47:53, p1 + q1 ≈ 43

-continued

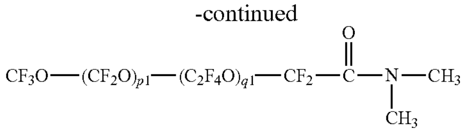

p1:q1 = 47:53, p1 + q1 ≈ 43

The nucleophilic reagent used herein may be selected from allylmagnesium halides, 3-butenylmagnesium halides, 4-pentenylmagnesium halides, and 5-hexenylmagnesium halides, for example. Corresponding lithium reagents may also be used. The nucleophilic reagent may be used in an amount of 2 to 5 equivalents, preferably 2.5 to 3.5 equivalents, and more preferably about 3 equivalents per equivalent of reactive terminal group (concentration) of the polymer.

As the solvent, suitable fluorochemical solvents include hydrofluoroether (HFE) solvents (commercially available as Novec® products from 3M), such as 1,3-bistrifluoromethylbenzene, trifluoromethylbenzene, methyl nonafluorobutyl ether, methyl nonafluoroisobutyl ether, ethyl nonafluorobutyl ether, ethyl nonafluoroisobutyl ether, 1,1,1,2,3,4,4,5,5,5-decafluoro-3-methoxy-2-(trifluoromethyl)-pentane, and perfluoro solvents composed of perfluorinated compounds (commercially available as Fluorinert® products from 3M). Organic solvents are also useful, for example, ether solvents such as tetrahydrofuran, monoethylene glycol dimethyl ether, diethylene glycol dimethyl ether, triethylene glycol dimethyl ether, tetraethylene glycol dimethyl ether, and dioxane. The solvent may be used in an amount of 10 to 300 parts, preferably 100 to 200 parts, and more preferably about 150 parts by weight per 100 parts by weight of the polymer.

Subsequently, 1M hydrochloric acid aqueous solution is added to quench the reaction. The reaction solution is separated into a water layer and a fluorochemical solvent layer by separatory operation. The fluorochemical solvent layer is washed with acetone before the solvent is distilled off, yielding a fluoropolyether-containing polymer. For example, when the perfluorooxyalkyl-containing polymer is of the formula:

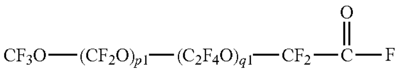

p1:q1 = 47:53, p1 + q1 ≈ 43 and the nucleophilic reagent is allylmagnesium halide, there is obtained a fluoropolyether-containing polymer having a hydroxyl group, represented by the following structure.

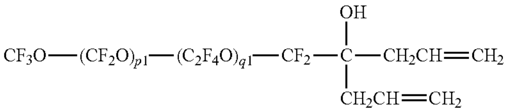

p1:q1 = 47:53, p1 + q1 ≈ 43

The fluoropolyether-containing polymer of formula (1) wherein α is 2 may be prepared, for example, by the following method. A perfluorooxyalkylene-containing polymer having an acid fluoride group (—C(═O)—F) at either end of the molecular chain is mixed with a Grignard reagent as a nucleophilic reagent and a solvent such as 1,3-bistrifluoromethylbenzene or tetrahydrofuran, and aged at a temperature of 0 to 80° C., preferably 50 to 70° C., and more preferably about 60° C. for 1 to 6 hours, preferably 3 to 5 hours, and more preferably about 4 hours.

Besides the acid fluoride, the perfluorooxyalkylene-containing polymer may have another group at either end of the molecular chain, such as acid halide, acid anhydride, ester, carboxylic acid or amide. Examples of the perfluorooxyalkylene-containing polymer having such groups at both ends of the molecular chain are shown below.

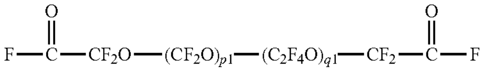

p1:q1 = 47:53, p1 + q1 ≈ 43

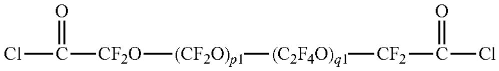

p1:q1 = 47:53, p1 + q1 ≈ 43

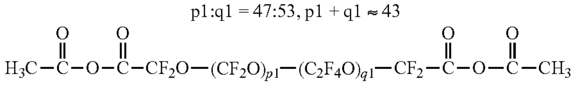

p1:q1 = 47:53, p1 + q1 ≈ 43

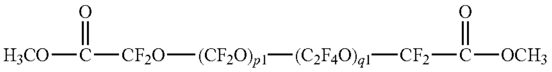

p1:q1 = 47:53, p1 + q1 ≈ 43

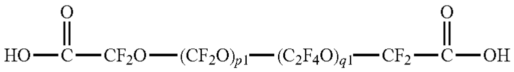

p1:q1 = 47:53, p1 + q1 ≈ 43

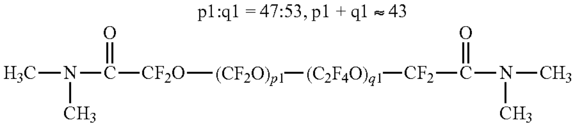

p1:q1 = 47:53, p1 + q1 ≈ 43

The nucleophilic reagent used herein may be selected from allylmagnesium halides, 3-butenylmagnesium halides, 4-pentenylmagnesium halides, and 5-hexenylmagnesium halides, for example. Corresponding lithium reagents may also be used. The nucleophilic reagent may be used in an amount of 4 to 10 equivalents, preferably 5 to 7 equivalents, and more preferably about 6 equivalents per equivalent of reactive terminal group (concentration) of the polymer.

As the solvent, suitable fluorochemical solvents include hydrofluoroether (HFE) solvents (commercially available as Novec® products from 3M), such as 1,3-bistrifluoromethylbenzene, trifluoromethylbenzene, methyl nonafluorobutyl ether, methyl nonafluoroisobutyl ether, ethyl nonafluorobutyl ether, ethyl nonafluoroisobutyl ether, 1,1,1,2,3,4,4,5,5,5-decafluoro-3-methoxy-2-(trifluoromethyl)-pentane, and perfluoro solvents composed of perfluorinated compounds (commercially available as Fluorinert® products from 3M). Organic solvents are also useful, for example, ether solvents such as tetrahydrofuran, monoethylene glycol dimethyl ether, diethylene glycol dimethyl ether, triethylene glycol dimethyl ether, tetraethylene glycol dimethyl ether, and dioxane. The solvent may be used in an amount of 10 to 300 parts, preferably 100 to 200 parts, and more preferably about 150 parts by weight per 100 parts by weight of the polymer.

Subsequently, 1M hydrochloric acid aqueous solution is added to quench the reaction. The reaction solution is separated into a water layer and a fluorochemical solvent layer by separatory operation. The fluorochemical solvent layer is washed with acetone before the solvent is distilled off, yielding a fluoropolyether-containing polymer. For example, when the perfluorooxyalkylene-containing polymer is of the formula:

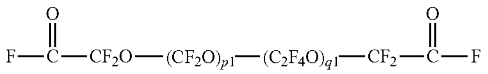

p1:q1 = 48:52, p1 + q1 ≈ 43 and the nucleophilic reagent is allylmagnesium halide, there is obtained a fluoropolyether-containing polymer having a hydroxyl group, represented by the following structure.

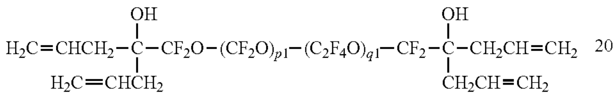

p1:q1 = 47:53, p1 + q1 ≈ 43

EXAMPLE

Examples of the invention are given below by way of illustration and not by way of limitation.

Example 1

A reactor was charged with 150 g of tetrahydrofuran and 300 g of 1,3-bistrifluoromethylbenzene, to which 160 ml of 0.7M allylmagnesium bromide was added dropwise. Subsequently, 300 g ($4.8\times10^{-2}$ mol) of a compound of the following formula (I) was slowly added dropwise.

(I)

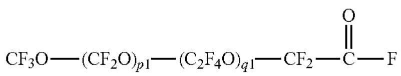

p1:q1 = 47:53, p1 + q1 ≈ 43

The resulting solution was heated at 60° C. for 4 hours. Thereafter, it was cooled to room temperature and added dropwise to 300 g of 1.2M hydrochloric acid aqueous solution to quench the reaction. The lower layer or fluoro compound layer was recovered by separatory operation and washed with acetone. The lower layer or fluoro compound layer after washing was recovered again. The residual solvent was distilled off in vacuum, yielding 292 g of a fluoropolyether-containing polymer of the following formula (II).

(II)

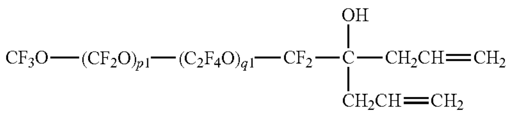

p1:q1 = 47:53, p1 + q1 ≈ 43

The polymer was analyzed by $^1$H-NMR, with the results shown below.

$^1$H-NMR $\delta$2.2(—CO$\underline{\text{H}}$($CH_2CH{=}CH_2$)$_2$)1H $\delta$2.4(—COH(C$\underline{\text{H}}_2$CH=$CH_2$)$_2$)4H $\delta$5.1(—COH($CH_2$CH=C$\underline{\text{H}}_2$)$_2$)4H $\delta$5.7(—COH($CH_2$C$\underline{\text{H}}$=$CH_2$)$_2$)2H

Example 2

A reactor was charged with 150 g of tetrahydrofuran and 300 g of 1,3-bistrifluoromethylbenzene, to which 320 ml of 0.7M allylmagnesium bromide was added dropwise. Subsequently, 300 g ($9.6\times10^{-2}$ mol) of a compound of the following formula (III) was slowly added dropwise.

(III)

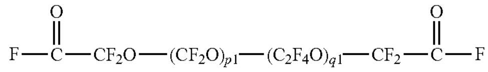

p1:q1 = 47:53, p1 + q1 ≈ 43

The resulting solution was heated at 60° C. for 4 hours. Thereafter, it was cooled to room temperature and added dropwise to 300 g of 1.2M hydrochloric acid aqueous solution to quench the reaction. The lower layer or fluoro compound layer was recovered by separatory operation and washed with acetone. The lower layer or fluoro compound layer after washing was recovered again. The residual solvent was distilled off in vacuum, yielding 286 g of a fluoropolyether-containing polymer of the following formula (IV).

(IV)

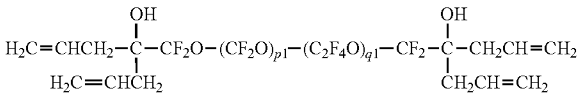

p1:q1 = 47:53, p1 + q1 ≈ 43

The polymer was analyzed by $^1$H-NMR, with the results shown below.

$^1$H-NMR $\delta$2.2(—CO$\underline{\text{H}}$($CH_2CH{=}CH_2$)$_2$)1H $\delta$2.4(—COH(C$\underline{\text{H}}_2$CH=$CH_2$)$_2$)4H $\delta$5.1(—COH($CH_2$CH=C$\underline{\text{H}}_2$)$_2$)4H $\delta$5.6(—COH($CH_2$C$\underline{\text{H}}$=$CH_2$)$_2$)2H

Example 3

A reactor was charged with 150 g of tetrahydrofuran and 300 g of 1,3-bistrifluoromethylbenzene, to which 160 ml of 0.7M allylmagnesium bromide was added dropwise. Subsequently, 300 g ($4.8\times10^{-2}$ mol) of a compound of the following formula (V) was slowly added dropwise.

(V)

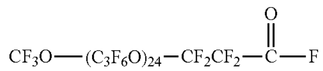

The resulting solution was heated at 60° C. for 4 hours. Thereafter, it was cooled to room temperature and added dropwise to 300 g of 1.2M hydrochloric acid aqueous solution to quench the reaction. The lower layer or fluoro compound layer was recovered by separatory operation and washed with acetone. The lower layer or fluoro compound layer after washing was recovered again. The residual solvent was distilled off in vacuum, yielding 277 g of a fluoropolyether-containing polymer of the following formula (VI).

(VI)

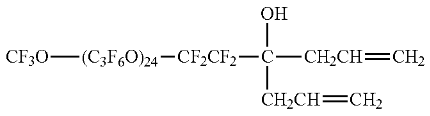

The polymer was analyzed by $^1$H-NMR, with the results shown below.

$^1$H-NMR $\delta$2.2(—CO$\underline{H}$($CH_2CH$=$CH_2$)$_2$)1H $\delta$2.3(—COH(C$\underline{H_2}$CH=$CH_2$)$_2$)4H $\delta$5.1(—COH($CH_2CH$=C$\underline{H_2}$)$_2$)4H $\delta$5.7(—COH($CH_2$C$\underline{H}$=$CH_2$)$_2$)2H Japanese Patent Application No. 2014-074126 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A fluoropolyether-containing polymer having the general formula (1):

(1)

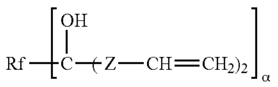

wherein Rf is a polymer residue comprising a monovalent fluorooxyalkyl group, Z is a divalent hydrocarbon group, $\alpha$ is 1, and said monovalent fluorooxyalkyl group has the general formula (2):

$$F\text{-}(CF_2O)_p\text{-}(C_2F_4O)_q\text{-}(C_3F_6O)_r\text{-}(C_4F_8O)_s \quad (2)$$

wherein p, q, r and s are each independently an integer of 0 to 200, the sum p+q+r+s is 3 to 200, each repeating unit may be linear or branched, and individual repeating units may be randomly arranged.

2. A fluoropolyether-containing polymer having the general formula (1):

(1)

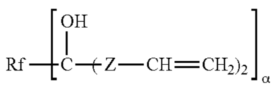

wherein Rf is a polymer residue comprising a monovalent fluorooxyalkylene group, Z is a divalent hydrocarbon group, $\alpha$ is 2, and said divalent fluorooxyalkylene group has the general formula (3):

$$\text{—}O\text{-}(CF_2O)_p\text{-}(C_2F_4O)_q\text{-}(C_3F_6O)_r\text{—}(C_4F_8O)_s \quad (3)$$

wherein p, q, r and s are each independently an integer of 0 to 200, the sum p+q+r+s is 3 to 200, each repeating unit may be linear or branched, and individual repeating units may be randomly arranged.

3. The fluoropolyether-containing polymer of claim 1, wherein Z is a straight alkylene group of 1 to 4 carbon atoms or a phenylene group.

4. The fluoropolyether-containing polymer of claim 2, wherein Z is a straight alkylene group of 1 to 4 carbon atoms or a phenylene group.

5. The fluoropolyether-containing polymer of claim 1, having a formula selected from the group consisting of formulae (1-a), (1-b), (1-c), (1-d) and (1-e):

(1-a)

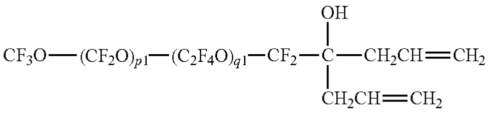

lp;2p (1-b)

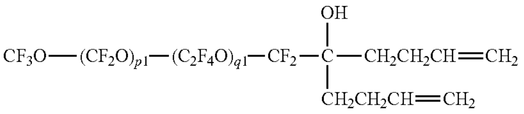

(1-c)

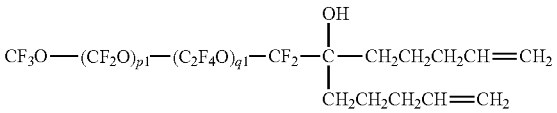

(1-d)

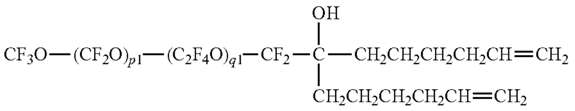

(1-e)

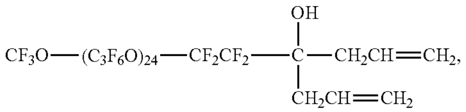

wherein the ratio p1:q1 is 47:53, and the sum p1+q1 is approximately 43.

6. The fluoropolyether-containing polymer of claim 2, having a formula selected from the group consisting of formulae (1-f), (1-g), (1-h) and (1-i):

(1-f)

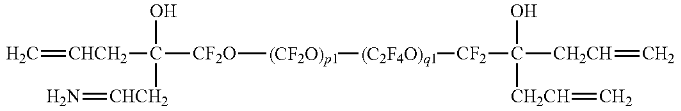

(1-g)

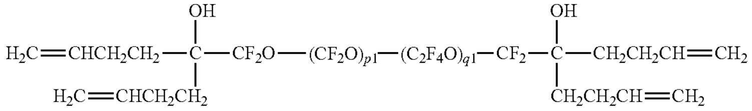

(1-h)

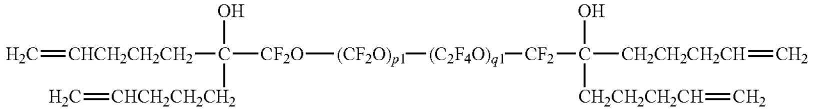

(1-i)

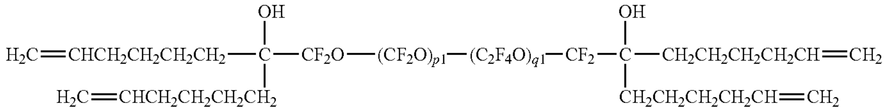

wherein the ratio p1:q1 is 47:53, and the sum p1+q1 is approximately 43.

7. The fluoropolyether-containing polymer of claim 5, having the formula (1-a).

8. The fluoropolyether-containing polymer of claim 5, having the formula (1-b).

9. The fluoropolyether-containing polymer of claim 5, having the formula (1-c).

10. The fluoropolyether-containing polymer of claim 5, having the formula (1-d).

11. The fluoropolyether-containing polymer of claim 5, having the formula (1-e).

12. The fluoropolyether-containing polymer of claim 6, having the formula (1-f).

13. The fluoropolyether-containing polymer of claim 6, having the formula (1-g).

14. The fluoropolyether-containing polymer of claim 6, having the formula (1-h).

15. The fluoropolyether-containing polymer of claim 6, having the formula (1-i).

* * * * *